United States Patent [19]

Deutschmann

[11] 4,418,536
[45] Dec. 6, 1983

[54] RECIPROCATING INTERNAL COMBUSTION ENGINE WITH DISCONNECTIBLE EXHAUST TURBOCHARGERS

[75] Inventor: Herbert Deutschmann, Friedrichshafen, Fed. Rep. of Germany

[73] Assignee: MTU Motoren-und Turbinen-Union Friedrichshafen GmbH, Fed. Rep. of Germany

[21] Appl. No.: 297,508

[22] Filed: Aug. 28, 1981

[30] Foreign Application Priority Data

Aug. 28, 1980 [DE] Fed. Rep. of Germany ....... 3032435

[51] Int. Cl.³ ............................................. F02B 37/00
[52] U.S. Cl. ...................................... 60/602; 60/611; 60/612
[58] Field of Search ................. 60/600, 601, 602, 603, 60/611, 612

[56] References Cited

U.S. PATENT DOCUMENTS 2,359,615 10/1944 Browne ................................. 60/602
4,299,090 11/1981 Deutschmann ....................... 60/606

FOREIGN PATENT DOCUMENTS

2809202 9/1979 Fed. Rep. of Germany ........ 60/612
2855551 7/1980 Fed. Rep. of Germany ........ 60/612
2005765 4/1979 United Kingdom ................. 60/612

Primary Examiner—Douglas Hart
Attorney, Agent, or Firm—Craig & Burns

[57] ABSTRACT

A reciprocating internal combustion engine which includes several exhaust gas turbochargers, with one or more of the exhaust gas turbochargers being adapted to be disconnected during partial load operation of the engine. A blocking device such as, for example, a flap, a valve, or the like is arranged in an exhaust gas duct and in an intake duct of each disconnectible exhaust gas turbocharger. For a connection or disconnection of the respective exhaust gas turbochargers, the exhaust gas blocking device is opened or closed, respectively, arbitrarily or under control of operating parameters of the internal combustion engine. An operating or coupling connection is provided between the exhaust gas blocking device and the supercharger air blocking device. The connection permits, upon a connection of the exhaust gas turbocharger, with the supercharger air blocking device still being closed, an opening of the exhaust gas blocking device only up to an intermediate position at which the rotational speed of the non-conveying or inoperative turbocharger is limited to permissible values, and permitting a further opening of the exhaust gas blocking device only together with or after an opening of the supercharging air blocking device.

40 Claims, 10 Drawing Figures

RECIPROCATING INTERNAL COMBUSTION ENGINE WITH DISCONNECTIBLE EXHAUST TURBOCHARGERS

The present invention relates to an internal combustion engine and, more particularly, to a reciprocating internal combustion engine provided with several exhaust gas turbochargers, with one or more of the exhaust gas turbochargers being adapted to be disconnected during a partial load operation of the internal combustion engine, and with a shut-off or blocking device such as, for example, a flap, a valve, or the like, in an exhaust gas duct and an intake duct of each disconnectible exhaust gas turbocharger, wherein, for a connection or disconnection of the respective exhaust gas turbocharger, the exhaust gas blocking or shut-off device is opened or closed, respectively, arbitrarily or under a control of operating parameters of the internal combustion engine.

In turbines of exhaust gas turbochargers, a free cross section between the turbine vanes or buckets, customarily designed or constructed for full load operation with a thus produced amount of exhaust gas, it too large during partial load operation for the amount of exhaust gases supplied, which amount is reduced during the partial load operation. For this reason, a pressure gradient which can at best be obtained during partial load is much too small for the turbines of the exhaust gas turbochargers. By disconnecting one or several of the exhaust gas turbochargers, the turbine cross section for the exhaust gases is correspondingly reduced and a higher pressure gradient can be obtained for the connecting turbines thereby resulting in a correspondingly higher turbine power. Furthermore, the turbines and compressors of the connected exhaust gas turbochargers are operated in a proximity of their rated operating point, that is, at an operating point for which they were designed or constructed, and thus operate with a higher degree of efficiency. Consequently, the exhaust gas turbochargers can provide a higher supercharging pressure and a greater amount of air for supercharging purposes. Due to the greater excess air, the combustion characteristics of the internal combustion engine is improved, the fuel consumption is lowered, and a smoke free operation is obtained even with internal combustion engines designed for a high intermediate or medium pressure.

In an internal combustion engine it has been proposed to arrange a check value in an intake duct of the compressor of the turbocharger to enable a simple connection or disconnection of the exhaust gas tubrocharger on the air intake side. The check valve is adapted to be open when the turbocharger is added due to the thus produced vacuum in the intake duct of the starting up compressor and is closed again upon a disconnection by the pressure in the supercharger air conduit.

A disadvantage of the above proposed construction resides in the fact that, when a turbocharger is connected, a danger exists that the turbine is not placed under a load by the compressor due to, for example, a reluctant or jamming check valve, because air transport through the check valve is prevented since the valve does not assume an open position. In such a situation, the exhaust gas turbocharger may be destroyed by an overspeeding.

A further disadvantage of the above proposed construction resides in the fact that the speed of the exhaust gas turbocharger to be connected may temporarily assume a higher value than the presently existing operating speed of the running exhaust gas turbochargers. The resulting short term overspeeding of the exhaust gas turbocharger to be connected is caused by a delay in an opening of the check valve due to the mass thereof, when the operating speed has been reached so that the load on the turbine, commencing due to the conveyance of air through the compressor, lags behind by a brief time interval, during which time interval the turbine can be further accelerated. Due to the ensuing pressure shocks in the supercharger air duct, the danger of vibrations being transmitted also exists for the remaining exhaust gas turbochargers.

The aim underlying the present invention essentially resides in further developing and improving a device for an additional connection of turbochargers for a reciprocating internal combustion engine provided with disconnectible exhaust gas turbochargers.

In accordance with advantageous features of the present invention, an operative connection is provided between the exhaust gas shut-off or blocking device and the supercharger air blocking device, which connection permits, during a connection of the exhaust gas turbocharger with the supercharging air blocking device still being closed, an opening of the exhaust gas blocking device only up to an intermediate position at which the speed of the non-conveying turbocharger is limited to permissible values, and which permits a further opening of the exhaust gas blocking device only together with, or after, the opening of the supercharger air blocking device.

By virtue of the above-noted features of the present invention, an exhaust gas turbocharger is provided which is first of all securely protected from any damaging overspeeding during a connection of the turbocharger in a simple manner and without additional control components since the turbine, when the supercharger air blocking device does not open and thus does not apply a load, is merely exposed to a throttle exhaust gas strain and therefore the exhaust gas turbocharger can only assume a limited rotational speed.

Additionally, by virtue of the present invention, the acceleration of the speed of the exhaust gas turbocharger is reduced by the throttling of the exhaust gas stream; therefore, the speed increase is reduced within the time during which the supercharger air blocking device opens up and, accordingly, the short term overspeeding during the connection of the exhaust gas turbocharger is likewise mitigated.

The extent to which the short-term overspeeding is reduced can be effected by the degree of throttling of the exhaust gas stream in the intermediate position of the exhaust gas blocking device. In this manner, it is possible even to entirely avoid the short term overspeeding during a connection of the exhaust gas turbocharger or at least suppress such overspeeding to such an extent that any damaging effects on the vibration characteristic of the system are excluded.

Advantageously, in accordance with the present invention, a pressure drop in the exhaust gas system of the internal combustion engine, with accompanying triggering of vibrations, heretofore caused by the immediate complete opening of the exhaust gas blocking device is subdivided by the stepwise opening procedure thereby substantially lessening the adverse effects.

In order to safely avoid a loss of supercharger air by a premature opening of the supercharger air blocking device, in accordance with further features of the present invention, the supercharger air blocking device may be opened only after the pressure caused in the intake duct of the starting turbocharger by the other already operating turbo chargers has been lowered by a suction effect of the starting turbocharger.

In order to automatically adapt the compressor power to the turbine power, in accordance with the present invention, the operative connection permits an opening of the supercharger air blocking device by a suction or intake effect of the starting turbocharger independently of a position and/or opening movement of the exhaust gas blocking device, whereby the supercharger air blocking device can open more quickly as compared to the exhaust gas blocking device, if the exhaust gas turbocharger is capable of conveying a larger amount of air with its instantaneous speed. Moreover, a complete opening of the supercharger air blocking device is also made possible if the exhaust gas blocking device, for some unforeseeable reasons, is hung up or jammed in a position wherein it is not entirely open but at which the exhaust gas turbocharger can already assume high operating speeds.

During a disconnection of the exhaust gas turbocharger, a hanging up or jamming of the supercharger air blocking device in the open position and the ensuing loss of supercharger air from the remaining exhaust gas turbochargers may, in accordance with the present invention, be counteracted By providing that the operative connection moves the supercharger air blocking device into the closing direction during a closing of the exhaust gas blocking device for the disconnection of the exhaust gas turbocharger.

In order to afford or enable a movement of the supercharger air blocking means during a disconnection of the exhaust gas turbocharger in dependence upon the requirements of the compressor, in accordance with still further features of the present invention, the operative connection or coupling permits a closing of the supercharger air blocking device in case of a reduction in a suction effect of the exhaust gas turbocharger being disconnected due to a backflow of supercharger air occurring in the intake duct and arising from the other exhaust gas turbocharger, such closing being independently of the position and/or closing movement of the exhaust gas blocking device. By virtue of these features, it is additionally ensured that, in case of an unforseeable jamming or hanging up of the exhaust gas blocking device shortly before its closing position, at least the supercharger air blocking device may assume a closed position whereby loss of supercharger air is avoided.

In order to render especially safe operation of the connection step by the operative connection or coupling, in accordance with the present invention, the operative connection or coupling is formed as a mechanical linkage disposed between the two blocking devices by means of which, upon a movement of the exhaust gas blocking device in an opening direction, a shape mating connection is established between the two blocking devices at the intermediate position of the exhaust gas blocking device by an abutment against a stop means. By virtue of a construction of an operative connection or coupling in this manner, it is furthermore possible for the actuating means required for the exhaust gas blocking device to act also on the supercharger air blocking device and thereby support its opening movement. The same effect may also be attained for a disconnection or shut-off process by a second stop in the mechanical linkage which likewise entrains the supercharger air blocking device in a closing direction upon movement of the exhaust gas blocking device in the closing direction.

The mechanical linkage of the present invention may be constructed with customary components arranged in the supercharger air and exhaust gas line which permit a movement of the supercharger air blocking device independently of a position of the exhaust gas blocking device during a connection and disconnection of the exhaust gas turbocharger. For example, the mechanical linkage may include pivotable flaps functioning as the blocking devices, with each of the flaps being arranged on a rotatable shaft and being capable of being actuated by levers joined to the shaft. A tie rod may be articulated to one of the levers and may be shape matingly joined to the other lever by one stop acting in each of the two directions of movement, between which stops the supercharger air flap can move independent with respect to the exhaust gas flap.

A simple embodiment of a connecting devide of the present invention, which may be manufactured at low costs and with a minimum number of structual elements and which is controllable furthermore in a simple fashion, results in conjunction with the operative connection or coupling by an actuating or operating means for both blocking devices, with the actuating means having a stroke or path which is limited, in a position corresponding to the intermediate position of the exhaust gas blocking device by a lock, by a counterforce or by shutting off of an energy supply, with such action being discontinued upon a pressure drop in an intake pipe and/or upon an opening of the supercharger air blocking device.

In order to simply realize the obtaining of a counterforce, in accordance with the present invention, the actuating means may include a pressure medium cylinder accommodating a piston, with a pressure medium being fed, with limited pressure for opening the exhaust gas blocking device. The force exerted on the closed supercharger air blocking device by the supercharger air pressure from the remaining exhaust gas turbochargers ambient in the intake ducts acts as a counterforce on the piston through the operative connection and limits the piston stroke in the intermediate position of the exhaust gas blocking device.

It is also possible in accordance with the present invention to utilize the supercharger air of the internal combustion engine as the pressure medium for the pressure medium cylinder. By such an arrangement, it is not only possible to exploit an already existing auxiliary energy for operation but also the force acting in the opening sense on the supercharged air blocking device automatically adapts to the force which retains the supercharger air blocking device in the closed position so that an opening can indeed take place only once this force has been reduced on the basis of the increasing supercharger speed.

A safe opening of the blocking device is also possible in an arragement wherein the actuating means includes a pressure medium cylinder accommodating a piston with the counterforce being produced by a further pressure medium cylinder counteracting the first pressure medium cylinder.

Additionally, to ensure a safe opening of the blocking devices, the actuating means of the present invention may include a pressure medium cylinder with two pistons, of which one piston, upon application of a pressure medium, serves for opening the blocking devices and the second piston effects, upon a supply of pressure medium, a limitation of a stroke of the first piston in correspondence with an intermediate position of the exhaust gas blocking device by the counterforce exerted by the second piston on the first piston.

It is also possible in accordance with the present invention to ensure a safe opening of the blocking devices by providing a locking arrangement. More particularly, it is possible to provide a first actuating means which initially moves the exhaust gas blocking device in the intermediate position during a connection of the exhaust gas turbocharger and by a second actuating means effecting, with the aid of the operative connection, after a pressure drop in the intake duct of the compressor, an opening of the supercharger air blocking device as well as a complete opening of the exhaust gas blocking device. Advantageously, each of the actuating means may take the form of a pressure medium cylinder.

In accordance with further features of the present invention, both of the pressure medium cylinders forming the actuating means may be combined into one pressure medium cylinder with two pistons. When supplied with a pressure medium during a connection of the exhaust gas turbocharger, the first piston may execute only a limited stroke entraining also the second piston for opening the exhaust gas blocking device up to the intermediate position. The second piston, when supplied with pressure medium after a drop in the pressure of the intake duct, effects, with an opening of the supercharger air blocking device, a further opening of the exhaust gas blocking device.

By selecting appropriate piston diameters and pressures, very high operating forces may be attained without a negative effect on the function of a safe opening of the blocking devices.

In order to provide for an extensive independence from the respective installation conditions and/or the positioning of the blocking device, which position must be considered if the operative connection is constructed as a mechanical linkage, in accordance with still further features of the present invention, an operative connection or coupling may be provided which takes the form of a pneumatic, hydraulic or electrical operative connection which includes a transmitter, connected with one blocking device, and a receiver connected with the other blocking device, effecting a mutual dependency between the movement of the supercharger air blocking device and movement of the exhaust gas blocking device between the intermediate position and the open position.

With a hydraulic operative connection or coupling, advantageously in accordance with the present invention, a first pressure medium cylinder with two pistons may be provided for operating the exhaust gas blocking device, and a second pressure medium cylinder may be provided for operating the supercharger air blocking device. The first piston of the first cylinder, upon a supply of pressure medium for connecting the exhaust gas turbocharger, may execute only a limited stroke during which it entrains the second piston connected to the exhaust gas blocking device until the latter assumes its intermediate position. Upon a supply of pressure medium to the piston of the second pressure medium cylinder after a reduction of the pressure in the intake conduit, the second pressure medium cylinder opens the supercharger air blocking device and simultaneously displaces a pressure medium feed to the second piston of the first pressure medium cylinder whereby the second piston moves the exhaust gas blocking device from the intermediate position into the open position. Thus, a hydraulic operative connection or coupling is provided with a hydraulically or optionally pneumatically actuated servo-cylinder arrangement for controlling the positioning of the blocking devices.

In order to avoid vibration conditions and flow losses, it is also possible in accordance with the present invention, for both blocking devices to be retained in an open position after additional connection of the exhaust gas turbocharger by means of the forces effecting their opening step.

Advantageously, the actuating means for opening the supercharger air blocking device may be controlled by a switch operated by a pressure in the supercharger air duct and in the intake duct of the compressor of the supercharger to be added, with the switch releasing the energy for opening the supercharger air blocking device and for a residual opening of the exhaust gas blocking device and/or overcoming the counterforce if the two control pressure exhibit a predetermined pressure difference.

Considering the various areas of usage of an internal combustion engine, for example, a constant rotational speed or number of revolutions with fluctuating load or supercharger pressure, e.g., a generator drive; a fluctuation number of revolutions with constant load or supercharger pressure, e.g., drive mechanism for ships; and/or a fluctuating number of revolutions with fluctuating load or supercharger pressure, e.g., vehicle propulsion, according to the present invention, it is proposed that the level of supercharger air pressure and/or the number of revolutions or rotational speed of the reciprocating internal combustion engine respectively serve as a control signal for controlling an instant of connecting or disconnecting of the turbocharger in dependence upon the particular use of the engine.

Accordingly, it is an object of the present invention to provide a reciprocating internal combustion engine with disconnectible exhaust gas turbochargers which avoids, by simple means, shortcomings and disadvantages encountered in the prior art.

Another object of the present invention resides in providing a reciprocating internal combustion engine with disconnectible exhaust gas turbochargers which minimize if not avoids the danger of a destruction of the exhaust gas turbocharger by overspeeding upon a connection of an additional exhaust gas turbocharger by a blocked valve means.

Yet another object of the present invention resides in providing a reciprocating internal combustion engine with disconnectible exhaust gas turbochargers which minimize if not entirely avoids the a short term overspeeding from occurring during a connection of the exhaust gas turbocharger.

A further object of the present invention resides in providing a reciprocating internal combustion engine with disconnectible exhaust gas turbochargers which minimize if not avoid the generation of conditions conducive to vibrations.

A still further object of the present invention resides in providing a reciprocating internal combustion engine with disconnectible exhaust gas turbochargers which functions realiably under all operating loads.

These and other objects, features and advantages of the present invention will become more apparent from the following description when taken in connection with the accompanying drawings which show, for the purposes of illustration only, several embodiments in accordance with the invention, and wherein:

Figure 1:
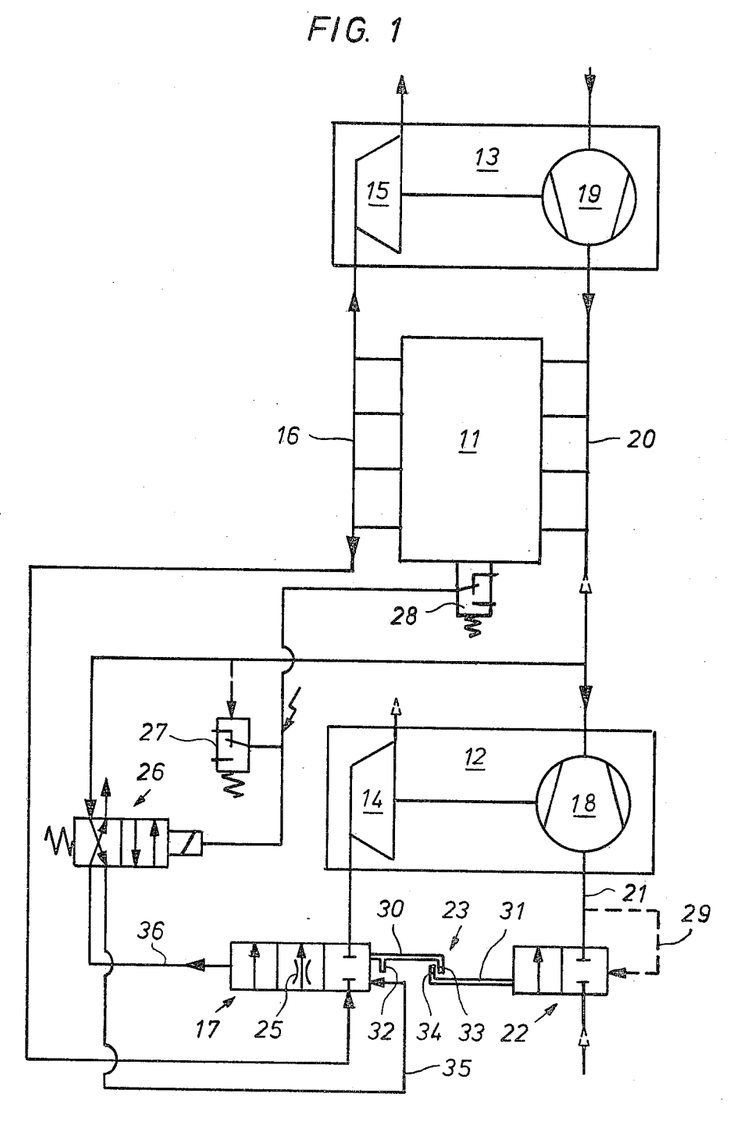
FIG. 1 is a partially schematic view of a reciprocating internal combustion engine constructed in accordance with the present invention and equipped with two exhaust gas turbochargers, one of which is disconnectible, with blocking or shut-off means for the exhaust gas and supercharging air, and an operative connection or coupling arranged therebetween.

Referring now to the drawings wherein like reference numerals are used throughout the various views to designate like parts and, more particularly, to FIG. 1, according to this Figure, a reciprocating internal combustion engine 11 is provided, which is equipped with a disconnectible exhaust gas turbocharger 12 and with a permanently operative exhaust gas turbocharger 13. The exhaust gas turbochargers 12, 13, respectively include turbines 14, 15 and compressors 18, 19 with the turbines 14, 15 being supplied with an exhaust gas from an exhaust gas manifold 16 of the engine 11. An exhaust gas blocking or shut-off means generally designated by the reference numeral 17 is arranged between the exhaust manifold 16 and the turbine 14 of the disconnectible exhaust gas turbocharger 12. The compressors 18, 19 of the two exhaust gas turbochargers 12, 13 are arranged so as to respectively feed a supercharging air duct 20 of the internal combustion engine 11. The supercharging air blocking or shut-off means generally designated by the reference numeral 22 is arranged in an air intake duct 21 of the compressor 18 of the disconnectible exhaust gas turbocharger 12.

The exhaust gas blocking means 17 is displaceable between open and closed positions and is also capable of assuming an intermediate position represented in FIG. 1 by a restrictor or throttle 25, wherein the blocking means 17 is only partially open. A solenoid valve generally designated by the reference numeral 26 acts upon the exhaust gas blocking device 17 by way of a conduit 35 or a conduit 36, with the solenoid valve 26, in turn, receiving its control pulses or impulses from a switch or sensor 27 controlled by the supercharging air or from a switch or sensor 28 controlled by a rotational speed of the engine 11. The supercharging air blocking or shut-off means 22 is directly acted upon, through a conduit 29, by a pressure in the intake duct 21 of the compressor 18 of the disconnectible exhaust gas turbocharger 12.

An operative connection or coupling generally designated by the reference numeral 23 is interposed between the two blocking or shut-off means 17, 22 with the operative connection 23 being formed, for example, as a mechnical linkage including linkage members 30, 31 with the linkage member 30 having a first stop or abutment 32 and a second stop or abutment 33 connected thereto, and the linkage member 31 having a stop or abutment 34 connected thereto.

The internal combustion engine of FIG. 1 operates in the following manner.

During a partial load operation of the engine 11, the engine is supercharged only by the permanently connected exhaust gas turbocharger 13. The pressure in the supercharging air conduit 20 and/or the rotational speed of the engine 11 are low so that the switches 27 and 28 are in open position. During a partial load operation, a spring 26a urges the solenoid valve 26 into the illustrated position so that the exhaust gas blocking or shut-off means 17 is exposed to the pressure of the supercharging air through the conduit 35 and is likewise in the illustrated closed position. The pressure of the supercharging air in the supercharging air conduit 20 also acts on the supercharging air blocking or shut-off means 22 through the compressor 18 and through the intake duct 21 as well as through the conduit 29 so as to keep or maintain the supercharging air blocking means in the illustrated closed position. Consequently, the exhaust gas turbocharger 12 is shut-off or disconnected from the engine 11 and the supercharging air conveyed by the exhaust gas turbocharger 13 cannot escape.

Upon an increase in a load on the internal combustion engine 11, the amount of fuel supplied to the engine 11 is increased in a conventional manner by a controller such as, for example, a speed governor, and with an increase in the load the amount of exhaust gases increases and the turbine 15 of the connected exhaust gas turbocharger 13 approaches a limit of its exhaust gas capacity. A dimension or criterion for this is the level of the supercharging air pressure which likewise increases. The switch 27, controlled by the supercharging air, is provided for connecting the exhaust gas turbocharger 12 in dependence upon a supercharging air pressure.

Depending upon the purpose for which the internal combustion engine 11 is employed, the idle or disconnectible exhaust gas turbocharger 12 may be advantageously connected or put into service in dependence upon a predetermined increase in the engine speed by the switch 28, the position of which is controlled by the number of revolutions or rotational speed of the engine 11.

Upon an actuation of one of the two switches 27 or 28, the solenoid value 26 is urged into a second position, and the exhaust gas blocking or shut-off means 17 is acted upon through the conduit 36 by the air pressure of the air in the supercharging air conduit 20 so that the blocking or shut-off means 17 is shifted or displaced into the intermediate position. In the intermediate position, the further opening movement of the blocking or shut-off means 17 is initially stopped because of the stop or abutment 32 of the mechanical linkage member 30 contacting the stop member 34 of the mechanical linkage member 31 and, at this point, the turbine 14 is exposed to a partial exhaust gas stream through the partially opened exhaust gas blocking means 17, that is, the restrictor 25, so that the exhaust gas turbocharger 12 is accelerated.

Upon the connecting of the exhaust gas turbocharger 12, the compressor 18 thereof is started up so that the pressure in the intake ducts 21 and in the conduits 29 is lowered and the supercharging air pressure acting on exhaust gas blocking or shut-off means 17 through the conduit 36 may then urge, with the aid of the operative connection 23, both blocking or shut-off means 17, 22 into their open positions. At this point in time, the full exhaust gas stream acts on the turbine 14 and, simultaneously, the compressor 18 conveys supercharging air so that the turbine 14 is under a load and the connection process of the exhaust gas turbocharger 12 is thus concluded. In an operating range of from medium to maximum load of the internal combustion engine 11, both exhaust gas turbochargers 12 and 13 are now supercharging the internal combustion engine 11.

The disconnection process of the exhaust gas turbocharger 12 is triggered upon a dropping of a load and/or a reduction in the speed of the engine 11 by operation of one of the two switches or sensors 27/28. The solenoid valve 26 is displaced or shifted to the illustrated position and urges the exhaust gas blocking or shut-off means 17, with the aid of the supercharging air pressure through the conduit 35, again into the closed position entraining also the supercharging air blocking or shut-off means 22 through the mechanical linkage members 30, 31, the second stop or abutment 33, and the stop or abutment 34 so that, in this manner, the disconnection process of the exhaust gas turbocharger 12 is concluded.

FIGS. 2–9 provide examples of arrangements wherein butterfly valves form an exhaust gas flap 40 and a supercharging air flap 41 respectively function as an exhaust gas and supercharging air blocking or shut-off means. The flaps 40 and 41 are respectively arranged on rotatably mounted shafts 42, 43 and are adapted to be respectively actuated by levers 44, 45.

Figure 2:
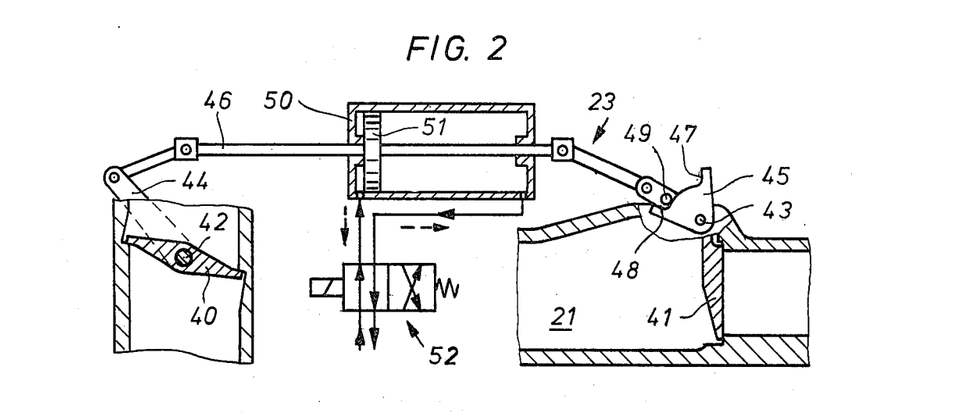
FIG. 2 is a partially schematic cross sectional detailed view, on an enlarged scale, of the blocking or shut-off means, mechanical operative connection or coupling, and pressure medium servo-cylinders prior to a connection of the exhaust gas turbochargers.
Figure 3:
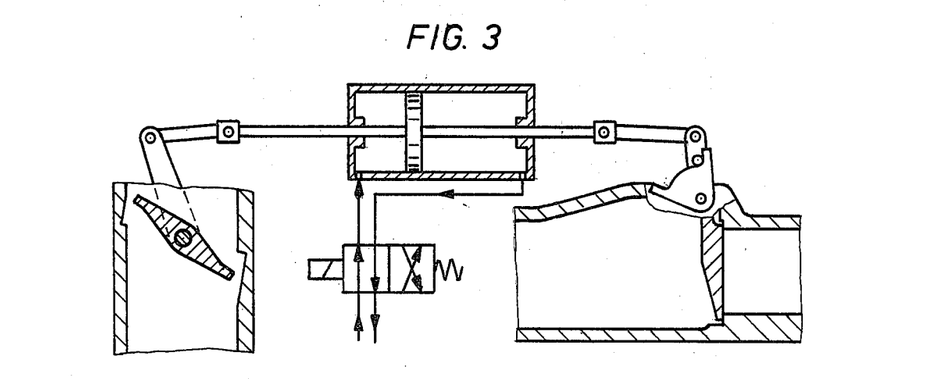
FIG. 3 is a partially schematic cross sectional detailed view, on an enlarged scale, of the arrangement of FIG. 2 with the exhaust gas valve in an intermediate position.
Figure 4:
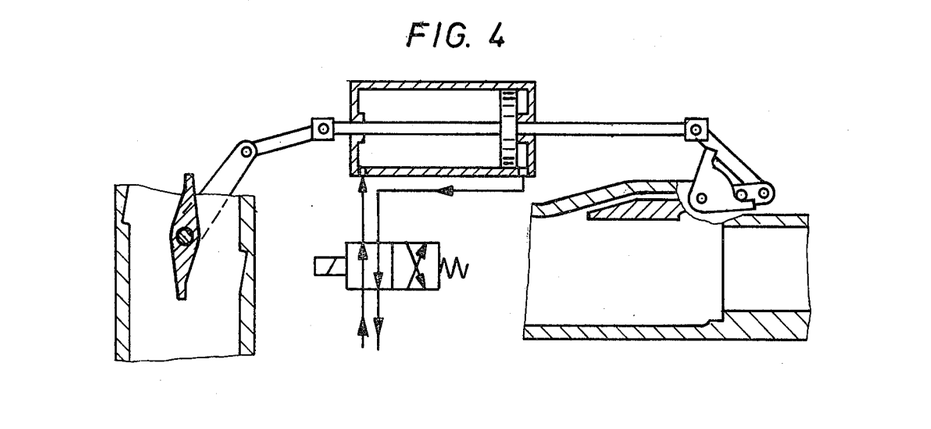
FIG. 4 is a partially schematic cross sectional detailed view, on an enlarged scale, of the arrangement of FIG. 2 after a connection of the exhaust gas turbocharger.

In the construction of FIGS. 2–8, operative connections or couplings generally designated by the reference numerals 23', 23", or 23'" and provided with the respective operative connections including a tie or coupling rod articulated to a lever and joined to a lever by stop or abutments. More particularly as shown in FIGS. 2–4, the operative connection 23' includes a tie or coupling rod 46 articulated to a lever 44 associated with the flap 40 and joined to a lever 45 associated with the flap 41, by stops 47, 48 and through a stop member 49. The supercharging air flap 41 is adapted to freely move with respect to the exhaust gas flap 40 between the two stops 47, 48.

In the arrangement of FIGS. 2–4, the connection process for connecting the exhaust gas turbocharger 12 is carried out by an actuating means constructed as an actuating cylinder and piston unit which includes an actuating cylinder 50 and a piston 51 displaceably mounted therein. The piston 51 is connected to the tie or coupling rod 46. The actuating means is controlled in the same manner as in FIG. 1 by way of a solenoid valve generally designated by the reference numeral 52. The operating pressure for the cylinder 50 is again the supercharging air pressure of the internal combustion engine, which pressure is likewise effective through the compressor of the disconnected exhaust gas turbocharger directly on the supercharging air flap 41 so as to keep the flap 41 in the closed position.

The arrangement of FIGS. 2–4 operate in the following manner.

The process of connecting the disconnected exhaust gas turbocharger is initiated by shifting of the solenoid valve 52 into the position shown in FIG. 2 so that the pressure of the supercharging air pressure acts on one side of the piston 51 and shifts the piston 51, as well as the exhaust gas flap 40, into the intermediate position illustrated in FIG. 3 wherein the stop member 49 of the tie rod 46 abuts against the stop 47 of the lever 45 of the supercharging air flap 41. The area of the piston 51 and of the supercharging air flap 41, as well as the lever ratio with which the connecting linkage acts through the stop 47 and the lever 45 on the supercharging air flap 41 are constructed so that at this instant, that is, with the disconnectible exhaust gas turbocharger still idle, a further shifting of the piston 51 and thus a further opening of the exhaust gas flap 40 beyond the intermediate position is impossible. By the partial opening of the exhaust gas flap 40, the turbine is now exposed to a partial exhaust gas stream which can accelerate the disconnectible exhaust gas turbocharger to such an extent that a reduction of the supercharger air pressure takes place in the intake duct 21.

Only after a reduction of the pressure in the intake duct 21, which results upon a starting up of the compressor of the disconnectible exhaust gas turbocharger, is the supercharging air acting on the piston 51 capable of further shifting the piston 51 and thus placing the exhaust gas flap 40 into the fully open position shown in FIG. 4. At the same time, the supercharging air flap 41 is likewise opened, the supercharging air flap 41 being capable of leading or running ahead of the actuating means. However, it is also possible to forcibly open the supercharging air flap 41 quickly with the aid of the actuating means if such becomes necessary due, for example, to the supercharging air flap 41 having a relatively large mass. Both flaps 40 and 41 are retained in the open position by the opening force.

The disconnection step is performed in the same manner as described in connection with FIG. 1 by a switching over of the solenoid valve 52 whereupon the supercharging air thereby acts on the piston 51 from the other side resulting first in a closing of the exhaust gas flap 40 and then of forcible extraining of the supercharging air flap 41 by the stop 48. The supercharging air flap 41, however may run ahead or lead the exhaust gas flap 40 into the closed position independently of the exhaust gas flap 40.

Figure 5:
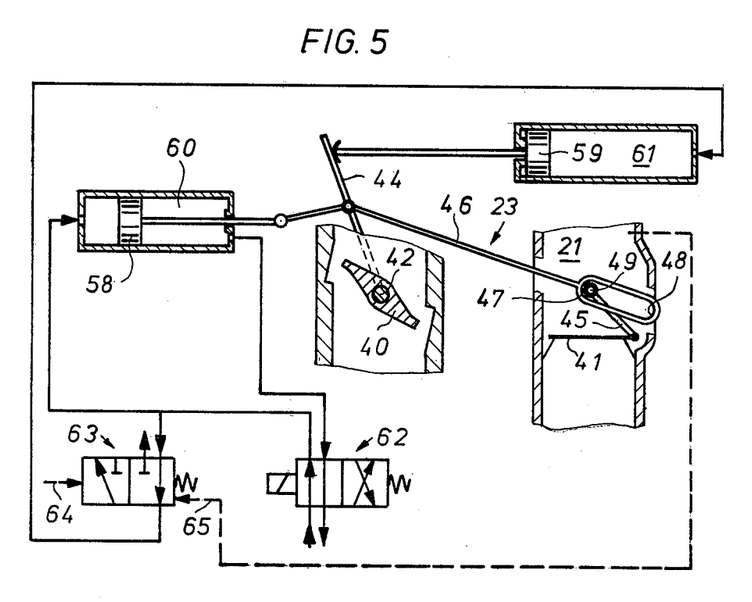
FIG. 5 is a partially schematic cross sectional view of another embodiment of an operative connection or coupling in accordance with the present invention with a pressure medium actuating means counteracted by a second actuating means as a locking means or counterforce in an intermediate position.
Figure 7:
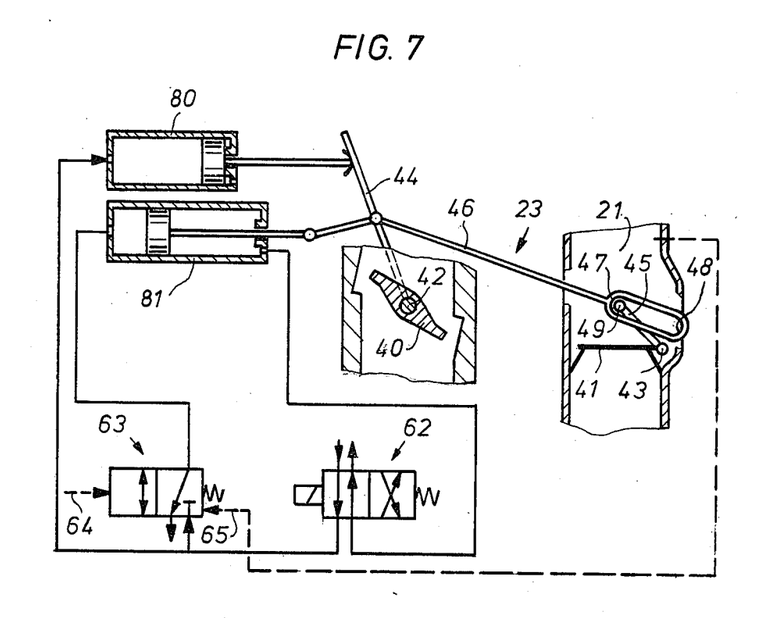
FIG. 7 is a partially schematic cross sectional view of yet another embodiment of an operative connection or coupling in accordance with the present invention, with a first actuating means for moving an exhaust gas locking means into an intermediate position, a second actuating means for opening a supercharging air blocking means, and for a complete opening of the exhaust gas locking means.

The operative connection 23' of FIGS. 5 and 7 as with the connection 23' includes a tie or coupling rod 46' articulated to a lever 44', associated with the exhaust gas flap 40, and joined to a lever 45', associated with the flap 41, by stops 48', 49', with the flap 41 being adapted to be freely movable relative to the flap 40. A piston 58 of the first pressure medium cylinder 60 is articulated to the lever 44' of the exhaust gas flap 40 and moves the flaps 40, 41 in the manner described hereinabove in connection with FIGS. 2-4, by way of the operative connection 23'. In the intermediate position of the exhaust gas flap 40, the flat movement is arrested by the piston 59 of a second pressure medium cylinder 61. The connection and disconnection processes are again initiated by a solenoid valve 62. However, in addition a switch generally designated by the reference numeral 63 is provided which is acted upon on one side by a pressure 64 in the supercharging air conduit and, on the other side, by a spring 63a and a pressure 65 in the intake duct 21 of the compressor. The switch 63 controls the pressure for the second pressure medium cylinder 61.

In the illustrated intermediate position of FIG. 5, the exhaust gas turbocharger has just been started up due to the partially opened exhaust gas flap 40. After a reduction of the pressure 65 in the intake duct 21, the switch 63 is shifted into its second switching position by the supercharging air pressure 64 and the cylinder 61 is relieved of pressure. The piston 58 of the cylinder 60 is now capable of simultaneously effecting a complete opening of the exhaust gas flap 40 and an opening of the supercharger air flap 41 so as to conclude the connection process of the disconnectible exhaust gas turbocharger.

During a disconnection of the exhaust gas turbocharger, the solenoid valve 62 is brought into its second position and thereby the cylinder 60 is acted upon from the other piston side. Thus, both flaps 40, 41 are returned to their respective closed position.

Figure 6:
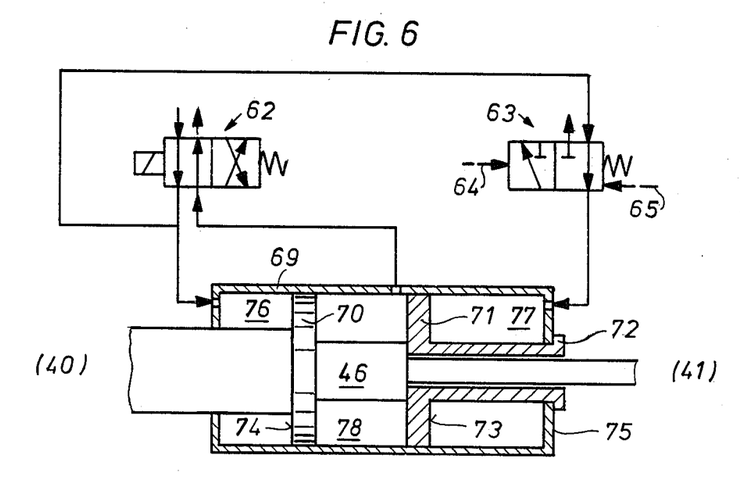
FIG. 6 is a partially schematic cross sectional view of a further embodiment of an operative connection or coupling in accordance with the present invention with a pressure medium actuating means counteracted by a second actuating means as a locking means or counterforce in the intermediate position.

FIG. 6 provides an example of a turbocharger connecting or adding system which functions in the same manner as that of FIG. 5 with the only difference residing in the fact that the two pressure medium cylinders 60, 61 are combined into a single unit which includes a cylinder 69 having disposed therein two pistons 70, 71. The piston 70 corresponds to the piston 58 of the cylinder 60, with the piston 71 corresponding to the piston 59 of the cylinder 61 in FIG. 5. A tie rod or coupling rod corresponding to the tie rod 46' of the operative connection is fashioned as a piston rod connected to the piston 70. The piston 71 includes a stop 72. The flaps are not illustrated in FIG. 6 but are indicated schematically by the parenthetically enclosed reference numerals 40, 41. In FIG. 6, the components of the connection system are illustrated in the intermediate position prior to a drop in pressure in the intake duct due to the compressor.

During a connection of the turbocharger, the piston 70 is acted upon from one side, i.e., pressure chamber 76, and the piston 71 from the other side, i.e., pressure chamber 77 of the cylinder 69. Since the effective area 73 of the piston 71 is larger than the effective area 74 of the piston 70, both pistons 70, 71 arrive at the position illustrated in FIG. 6 after an abutment or engagement of the stop 72 of the piston 71 against a cover 75 of the cylinder 69. After a pressure in the intake duct has dropped, the piston 71 is relieved by the switch 63 and the piston 70 may effect a complete opening of the exhaust gas flap 40 together with a simultaneous opening of the supercharging air flap 41.

For disconnecting the exhaust gas turbocharger, the chamber 78 between the two pistons 70, 71 is the only one exposed to a pressure and chambers 76 and 77 are relieved.

In the system of FIG. 7, a cylinder 80 is provided for opening the exhaust gas flap 40 up to its intermediate position. During this step, the piston of a further cylinder 81 is likewise set into motion subsequently effecting the further movement of the exhaust gas flap 40 into its fully opened position and, through the operative connection 23", also an opening of the subercharging air flap 41. The control functions of the connection system are achieved in the same way as described hereinabove in connection with FIG. 5 with the aid of the solenoid valve 62 and the switch 63, which switch is dependent upon the supercharging air pressure and on the intake duct pressure.

Figure 8:
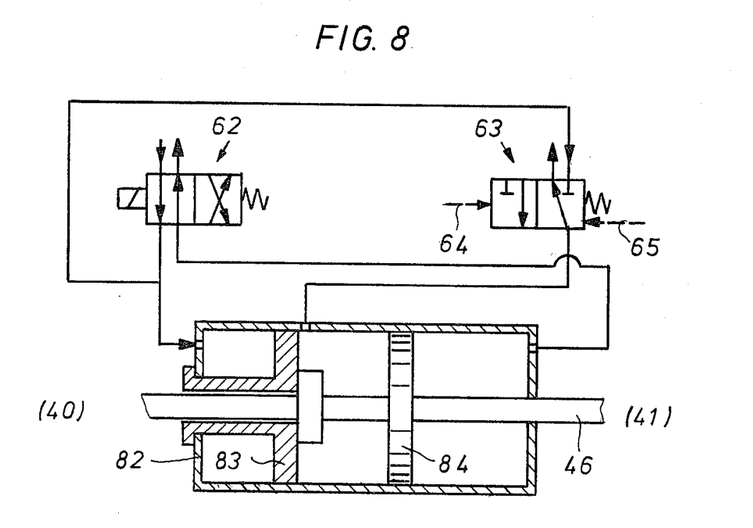
FIG. 8 is a partially schematic cross sectional view of a still further embodiment of an operative connection or coupling in accordance with the present invention, with a first actuating means for moving an exhaust gas blocking means into an intermediate position, a second actuating means for opening a supercharging air blocking means, and for a complete opening of the exhaust gas locking means.

FIG. 8 illustrates a combination of the two cylinders 80, 81 of FIG. 7 into a single cylinder 82 provided with a piston 83, which piston 83 corresponds in its effect to the piston of the cylinder 80 and with a piston 84 corresponding in its effect to the piston of cylinder 81 in FIG. 7.

The tie or coupling rod corresponding to the tie rod 46' of FIG. 7 is fashioned similarly as in the embodiment of FIG. 6 as a piston rod for the piston 84 and, as with FIG. 6, the components of the connection system of FIG. 8 are illustrated in the intermediate position.

Figure 9:
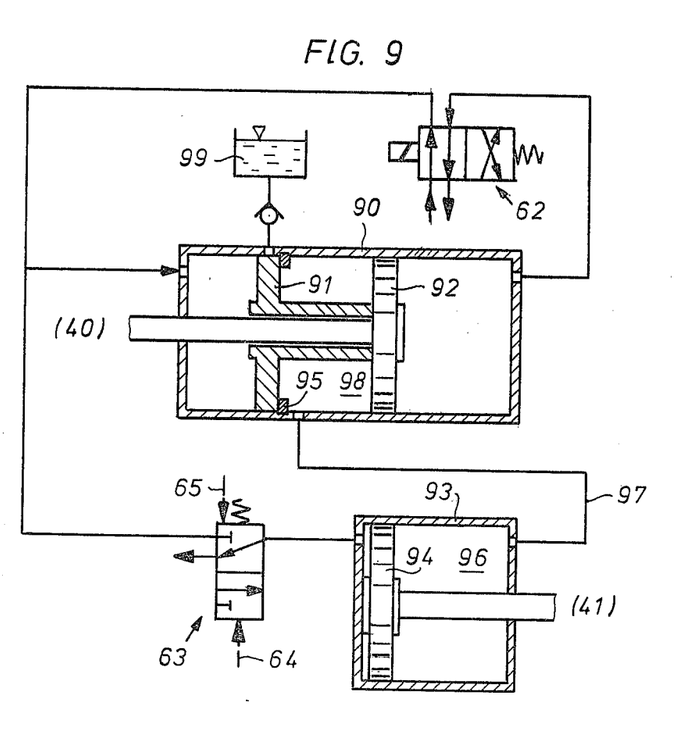
FIG. 9 is a partially schematic cross sectional view of a hydraulic operative connection or coupling constructed in accordance with the present invention.

FIG. 9 provides an example of another connection system, again illustrated in the intermediate position, which includes a first pressure medium cylinder 90 having a piston 91 and a second piston 92 connected to the exhaust gas flap (not shown) and a second pressure medium cylinder 93 with a piston 94 connected to the supercharging air flap (not shown). In the embodiment of FIG. 9, the operative connection or coupling consists of a pressure medium chamber 96 in the supercharging air flap cylinder 93, a pressure medium chamber 98 arranged between the two piston 91, 92 of the exhaust gas flap cylinder 90, a conduit 97 connecting the two pressure medium chambers 96, 98, and a pressure medium filling the pressure medium chambers 96, 98.

The arrangement of FIG. 9 is controlled by a solenoid valve 62 and the switch 63 in the manner described hereinabove in connection with FIG. 5. The piston 91 moves first of all while entraining the piston 92 in the exhaust gas flap up to a stop 95. During this step, the exhaust gas flap is opened to its intermediate position. After a starting up of the exhaust gas turbocharger and a reduction of the pressure 65 in the intake duct 21, the switch 63 is placed by the supercharging air pressure 64 into its second switching position and thereby the piston 94 of the cylinder 93 is acted upon by the pressure medium. Thereby, the supercharging air flap is opened and simultaneously the pressure medium is displaced from chamber 96 via the conduit 97 into the chamber 98 associated with the first pressure medium cylinder 90. As a result, the piston 92 enters its other end position and thus the exhaust gas flap 40 moves into its entirely open position thereby concluding the connection step of the exhaust gas turbocharger.

For disconnecting purposes, the solenoid valve 62 is controlled into its other position and thereby the piston 92 is acted upon from the other side. By the piston 92 and the pressure medium in chamber 98, the piston 91 and the piston 94 are urged back into their starting position and thus the exhaust gas and supercharging air flaps are once again closed thereby concluding the disconnection process of the exhaust gas turbocharger. The pressure medium for filing the pressure medium chambers 96, 98 is accommodated in a storage tank 99 which is adapted to replenish the pressure medium lost due to leakage in the chamber 98 in the disconnected position.

Figure 10:
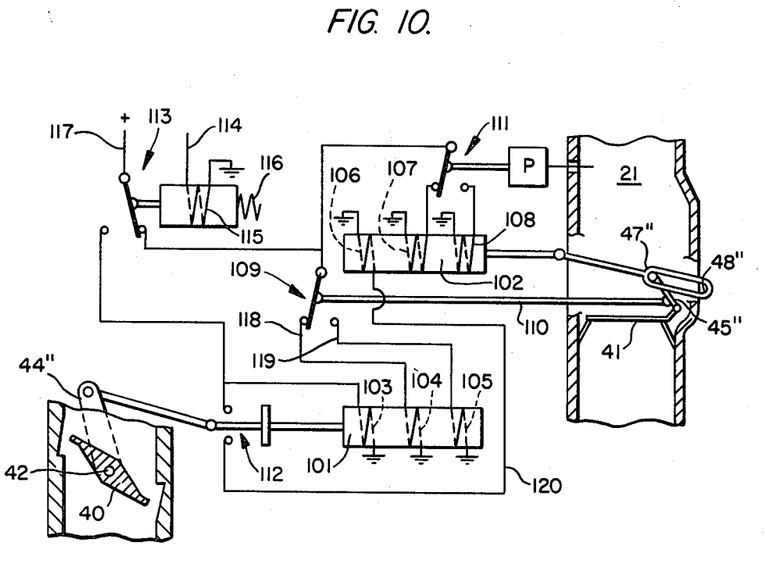
FIG. 10 is a partially schematic cross sectional view of an electrical operative connection or coupling in accordance with the present invention.

FIG. 10 provides an example of yet another connection or coupling system wherein an actuation of the exhaust valve is accomplished by a lever 44" through a lifting electromagnet 101 and an actuation of the charging air valve 41 is accomplished by a lever 44", with two stops 47" and 48" being actuated by a further lifting electromagnet 102. The electromagnet 101 includes windings 103, 104 and 105, which are adapted to move the magnet 101 and hence the exhaust valve 40 into three different positions when energized. Upon an excitation or energization of the winding 103, the magnet 101 closes the exhaust valve 40. With an excitation or energization of the winding 104 the magnet 101 places the exhaust valve 40 in the intermediate position and, upon an energization of the winding 105, the magnet 101 completely opens the exhaust valve 40.

The electromagnet 102 also includes three windings 106, 107 and 108. When the winding 106 is energized, the charging air valve 41 is closed and locked in that position by stop 48". Upon an energization of the winding 107, the electromagnet 102 opens the lock resulting from the action of the stop 48". As noted above, the charging air valve 41 is maintained closed by the charging air pressure in the intake line 21 or opened when the pressure drops. When winding 108 is energized, the charging air valve 41 is locked in an open position by the electromagnet 102 through the stop 47".

A switch generally designated by the reference numeral 109 is actuated by the lever 45" through a rod 110 by which an excitation or energization of the windings 104 and 105 of the electromagnet 101 are switched or controlled. The pressure in the intake line 21 is sensed by a conventional pressure sensor P, with the sensed pressure actuating a pressure switch generally designated by the reference numeral 111 for switching or controlling the excitation or energization of the windings 107 and 108 of the electromagnet 102. When the exhaust valve 40 moves, a switch generally designated by the reference numeral 112 is actuated so as to control the energization of the winding 106 of the electromagnet 102.

A magnetic switch generally designated by the reference numeral 113 is controlled through a line 114 from switches 27, or 28 (FIG. 1). When a coil 115 of the magnetic switch 113 is energized, the magnetic switch 113 assumes the position shown in FIG. 10. When the current is switched off by the switches 27 and/or 28, the magnetic switch 113 is returned to the other position by the force of the spring 116. A line 117 is provided for energizing the electrical system.

In the construction of FIG. 10, the operative connection or coupling is composed of the switches 109, 112 and windings 104, 105 and 106, controlled by the switches 109, 112, as well as the corresponding connecting lines 118, 119 and 120.

FIG. 10 illustrates the arrangement or condition of the various components with the exhaust valve 40 in the intermediate position. In operation, the magnetic switch 113 is moved to a desired position through line 114 either as a function of the charging air pressure through switch 27 (FIG. 1) or as a function of a rotational speed of the engine through the switch 28 (FIG. 1). The current then flows from the line 117 through switches 113, 109, and 111 through the windings 104 or 107 and, as a result thereof, the exhaust valve 40 is partially opened and the charging air valve 41 is unlocked. However, the charging air valve 41 is still held in a closed position by the pressure of the other exhaust gas turbocharger acting in the suction or intake line 21. The exhaust gas turbocharger can then start and reach a rotational speed at which the pressure in the intake line 21 is decreased by the starting compressor. This allows the charging air valve 41 to open at the right time. The pressure drop in the intake line 21 actuates the pressure switch 111 and thus turns off the winding 107 and connects the winding 108. The connecting or energization of the winding 108 locks the charging air valve 41 in the open position. At the same time, the switch 109 is actuated through the rod 110 and the switch 109 turns off the winding 104 and turns on the winding 105 of the electromagnet 101. The action completely opens the exhaust valve 40 and holds it in the open position; however, as a result of the electrical operative connection or coupling i.e., switch 109, line 119, and winding 105, this can only occur when the charging air valve 41 is completely open. This prevents the exhaust gas turbocharger from being switched on.

The shut off process is initiated by turning off the current in the winding 115 of the magnetic switch 113 by using the switch 27 and/or 28 (FIG. 1). Upon effecting a shut-off, the spring 116 urges the magnetic switch 113 to the left so as to disconnect the windings 105 and 108 and turn on the winding 103 of the electromagnet 101 so that the exhaust valve 40 is complete closed thereby shutting off the turbine. At the same time, the switch 112 is closed and thus turns on the winding 106. Now the charging air valve 41 is closed and locked by the charging pressure building up in the suction line 21 as a result of the decrease of rotational speed of the exhaust gas turbocharger and as a result of the operation of the electromagnet 102. However, because of the electrical connection or coupling of the switch 112, line 120, and winding 106, this can only occur after the exhaust valve 40 is closed.

While I have shown and described several embodiments in accordance with the present invention, it is understood that the same is not limited thereto but is susceptible of numerous changes and modifications as known to one having ordinarily skill in the art and I therefore do not wish to be limitied to the details shown and described herein, but intend to cover all such modifications as are encompassed by the scope of the appended claims.

I claim:

1. A reciprocating internal combustion engine comprising a plurality of exhaust gas turbocharger means, exhaust means for directing a flow of exhaust gases to the respective gas turbocharger means, and means for slectively connecting and disconnecting at least one exhaust gas turbocharger means during a partial load operation of the engine including a blocking means arranged in the exhaust means and a further blocking means arranged in an intake means of the at least one exhaust gas turbocharger means, coupling means are provided for operatively connecting the blocking means in the exhaust means to the further blocking means so as to permit, upon a connection of the at least one exhaust gas turbocharger means, the blocking means and the exhaust means to be opened only to an intermediate position at which a rotational speed of the at least one exhaust gas turbocharger means is limited to permissible values and to permit a further opening of the blocking means in the exhaust means only one of with or after an opening of the further blocking means.

2. The reciprocating internal combustion engine according to claim 1, wherein means are provided for sensing operating parameters of the engine and for providing output signals for controlling an operation of the coupling means.

3. The reciprocating internal combustion engine according to claim 2, wherein the blocking means in the exhaust means is a flap valve arranged in an exhaust gas duct means and the further blocking means is a flap valve arranged in the intake means of the at least one exhaust gas turbocharger means.

4. The reciprocating internal combustion engine according to one of claims 1, 2, or 3, wherein means are provided for connecting the remaining exhaust gas turbocharger means with the intake means of the at least one exhaust gas turbocharger means so that a pressure of the remaining exhaust gas turbocharger means is effective in the intake means, and the coupling means are constructed such that the further blocking means can only be opened when the pressure in the intake means is reduced due to a suction effect upon a starting up of the at least one gas turbocharger means.

5. The reciprocating internal combustion engine according to one of claims 1, 2, or 3, wherein the coupling means permits an opening of the further blocking means by a suction effect of the starting up exhaust gas turbocharger means independently of one of a position and movement of the blocking means in the exhaust means.

6. The reciprocating internal combustion engine according to one of claims 1, 2, or 3, wherein the coupling means includes means for moving the further blocking means in a closing direction during a closing of the blocking means in the exhaust means for disconnecting the at least one exhaust gas turbocharger means.

7. The reciprocating internal combustion engine according to one of claims 1, 2, or 3, wherein means are provided for connecting the remaining exhaust gas turbocharger means with the at least one exhaust gas turbocharger means so that a pressure of the remaining exhaust gas turbocharger means is effective in the intake means of the at least one exhaust gas turbocharger means, and the coupling means is constructed so as to permit a closing of the further blocking means due to a reduced suction effect of the at least one exhaust gas turbocharger means being disconnected by the pressure of the remaining exhaust gas turbocharger means in the intake means of the at least one exhaust gas turbocharger means independently of one of a position and closing movement of the blocking means in the exhaust means.

8. The reciprocating internal combustion engine according to one of claims 1 or 2, wherein the coupling means includes a plurality of mechanical linkage members interposed between the blocking means and the exhaust means and the further blocking means, and means are provided on the linkage members for establishing a shape-mating connection between the blocking means during a movement of the blocking means in the exhaust means in an opening direction.

9. The reciprocating internal combustion engine according to claim 8, wherein the shape-mating connection is established when the blocking means in the exhaust means is in the intermediate position, and the means for establishing the shape-mating connection includes a stop means provided on one of the linkage members.

10. The reciprocating internal combustion engine according to claim 9, wherein means are provided on one of the linkage members for entraining the further blocking means upon a movement of the blocking means in the exhaust means in a closing direction so as to move the further blocking means in the closing direction.

11. The reciprocating internal combustion engine according to claim 10, wherein the entraining means includes a further stop means provided on one of the linkage members.

12. The reciprocating internal combustion engine according to claim 8, wherein the blocking means and the exhaust means and the further blocking means are each formed as flap valve, each of the valves are mounted on a shaft and are respectively pivotally mounted in the exhaust means and the intake means, the mechanical linkage members include an actuating lever associated with each of the flap valve, a tie rod means having a first end pivotally connected to one of the actuating levers, and means for connecting a second end of the tie rod means to the other actuating lever so as to enable the flap valve associated with the other actuating lever to move independently with respect to the other flap valve.

13. The reciprocating internal combustion engine according to claim 12, wherein the means for connecting the second end of the tie rod means includes a pair of spaced stop means acting in each direction of movement of the flap valve.

14. The reciprocating internal combustion engine according to claim 12, wherein actuating means are provided for actuating the mechanical linkage members, means are provided for limiting an actuating stroke of the mechanical linkage members so as to displace the blocking means in the exhaust means to the intermediate position, and in that means are provided for rendering the limiting means ineffective upon at least one of a drop in pressure in the intake means of the at least one exhaust gas turbocharger means and an opening of the further blocking means.

15. The reciprocating internal combustion engine according to claim 14, wherein the limiting means are adapted to cut off a supply of energy to the actuating means.

16. The reciprocating internal combustion engine according to claim 14, wherein the limiting means are adapted to apply a counter force on the actuating means.

17. The reciprocating internal combustion engine according claim 12, wherein actuating means are provided for actuating the mechanical linkage members, the actuating means includes a pressure medium cylinder having an actuating piston displaceably mounted therein, the actuating piston is connected to the tie rod means, means are provided for supplying a pressure medium under a limited pressure to the pressure medium cylinder, means are provided for connecting the remaining exhaust gas turbocharger means with the intake means of the at least one exhaust gas turbocharger means so that a pressure of the remaining exhaust gas turbocharger means effective in the intake means acts on the further blocking means when in a closed position as a counterforce effective on the actuating piston through the tie rod means so as to limit a stroke of the actuating means to displace the blocking means in the exhaust means to the intermediate position, the counterforce being eliminated upon at least one of a drop of pressure in the intake means and an opening of the further blocking means.

18. The reciprocating internal combustion engine according to claim 17, wherein the supercharging air of the internal combustion engine is utilized as the pressure medium for the pressure medium cylinder.

19. The reciprocating internal combustion engine according to claim 12, wherein actuating means are provided for actuating the mechanical linkage members including a first pressure medium cylinder accommodating a displaceably mounted actuating piston connected to the tie rod means, and a second pressure medium cylinder accommodating a displaceably mounted piston is provided for applying a counterforce for for counteracting the first pressure medium cylinder to limit a stroke of the blocking means in the exhaust means to the intermediate position and to at least one of a drop in pressure in the intake means and an opening of the further blocking means.

20. The reciprocating internal combustion engine according to claim 12, wherein actuating means are provided for actuating the mechanical linkage members including a pressure medium cylinder accommodating a pair of displaceably mounted pistons, the pistons are connected to the tie rod means and are arranged in the cylinder so as to define three pressure chambers, means are provided for supplying a pressure medium to the respective pressure chambers, and means are provided for controlling a supply of the pressure medium to the respective chambers such that upon supplying pressure medium to one of the chambers the pressure medium acts upon one of the pistons to cause the blocking means to be moved in an opening direction and upon supplying pressure medium to another pressure chamber the pressure medium acts upon the other piston to limit a stroke of the first piston by a counterforce exerted by the other piston on the first piston so as to limit a stroke of the blocking means in the exhaust means to the intermediate position until at least one of the drop in pressure in the intake means and an opening of the further blocking means.

21. The reciprocating internal combustion engine according to one of claims 1 or 2, wherein a first actuating means is connected with the coupling means for initially moving the blocking means and the exhaust means into the intermediate position during a connection of the at least one exhaust gas turbocharger means, a second actuating means is connected with the coupling means for effecting an opening of the further blocking means after a pressure drop in the intake means and for completely opening the blocking means in the exhaust means.

22. The reciprocating internal combustion engine according to claim 21, wherein the first and second actuating means each include a pressure medium cylinder piston unit.

23. The reciprocating internal combustion engine according to claim 22, wherein the blocking means in the exhaust means and further blocking means are formed as flap valves, each of the valves are mounted on a shaft and are respectively pivotally arranged in the exhaust means and intake means.

24. The reciprocating internal combustion engine according to claim 21, wherein the first and second actuating means include a pressure medium cylinder having displaceably mounted therein a first and second piston, means are provided for supplying a pressure medium to the pressure medium cylinder, and when pressure medium is supplied to the pressure medium cylinder during a connection of the exhaust gas turbocharger, the first piston is adapted to execute only a limited stroke entraining the second piston for opening the blocking means in the exhaust means up to the intermediate position, the second piston, after a drop in pressure in the intake means, being adapted to effect, with an opening of the further blocking means a further opening of the blocking means in the exhaust means.

25. The reciprocating internal combustion engine according to one of claims 1, 2, or 3, wherein the coupling means is a pneumatic coupling means.

26. The reciprocating internal combustion engine according to one of claims 1, 2, or 3, wherein the coupling means is a hydraulic coupling means.

27. The reciprocating internal combustion engine according to one of claims 1, 2, or 3, wherein the coupling means is an electrical coupling means between a transmitter means connected to one of the blocking means and a receiver means connected to the other blocking means, and the transmitter means and receiver means are adapted to effect a mutual dependency between a movement of the further blocking means and a movement of the blocking means in the exhaust means between the intermediate position and the open position.

28. The reciprocating internal combustion engine according to claim 1, wherein the coupling means is a hydraulic coupling including a first pressure medium cylinder having displaceably mounted therein two pistons for operating the blocking means disposed in the exhaust means, and a second pressure medium cylinder having a piston displaceably mounted therein for operating the further blocking means, means are provided for supplying a pressure medium to the first and second pressure medium cylinders, means are provided for connecting the pressure medium cylinders to each other and to a pressure medium source, and means are provided for controlling a supply of the pressure medium to the pressure medium cylinders such that, upon a supply of pressure medium to the first pressure medium cylinder, the first piston of the first pressure medium cylinder executes only a limited stroke during which it entrains the second piston connected to the blocking means in the exhaust means and displaces the blocking means in the exhaust means to the intermediate position, and, upon a supply of pressure medium to the second pressure medium cylinder, after a reduction of pressure in the intake means, the piston of the second pressure medium cylinder opens the further blocking means and simultaneously displaces a pressure medium to the second piston of the first pressure medium cylinder, whereby the second piston moves the blocking means in the exhaust means into a fully opened position.

29. The reciprocating internal combustion engine according to claim 28, wherein after a connection of the at least one exhaust gas turbocharger, both blocking means are retained in an open position by forces that caused the opening.

30. The reciprocating internal combustion engine according to one of claims 28 or 29, wherein the means for controlling a supply of pressure medium includes a switch means controllable by a pressure in a supercharging air duct of the engine and a pressure in the intake means of the at least one exhaust gas turbocharger, the switch means being adapted to at least one of release and opening force for the further blocking means and for a further opening of the blocking means in the exhaust means to the fully open position and overcome a counterforce if the two pressures exhibit a predetermined pressure differential.

31. The reciprocating internal combustion engine according to claim 30, wherein means are provided for controlling an operation of the coupling means to determined an instant of connecting or disconnecting of the at least one exhaust gas turbocharger means for controlling an operation of the coupling means in dependence upon predetermined operating parameters of the engine determined by a type of usage of the engine.

32. The reciprocating internal combustion engine according to claim 31, wherein the predetermined parameters are at least one of a level of supercharging air pressure and rotational speed of the engine.

33. The reciprocating internal combustion engine according to one of claims 2 or 3, wherein the coupling means is an electrical coupling means including a first switch means operable in response to the output signals of the sensing means for controlling an operation of the coupling means, a first electromagnetic means is operatively connected with the further blocking means for controlling a positioning thereof, a second electromagnetic means operatively connected with the blocking means in the exhaust means for controlling a positioning thereof, a second switch means operable by the blocking means in the exhaust means for controlling an energization of the first electromagnetic means, a third switch means operable by the further blocking means for controlling an energization of the second electromagnetic means, and a fourth switch means for controlling an energization of the first electrmagnetic means in response to a pressure in the intake means.

34. The reciprocating internal combustion engine according to claim 33, wherein the first switch means is an electromagnetically operated switch displaceable between a first and second position, the first electromagnetic means includes a first winding means adapted to be energized when the first switch means is in the first position and the second switch means is in a closed position whereby the further blocking means is displaced to a closed position.

35. The reciprocating internal combustion engine according to claim 34, wherein the second electromagnetic means includes a first winding means adapted to be excited when the first switch means is in the first position whereby the blocking means in the exhaust means is displaced to a closed position.

36. The reciprocating internal combustion engine according to claim 35, wherein the fourth switch means is a pressure switch displaceable between a first and second position, and in that the first electromagnetic means includes a second winding means adapted to be energized when the first switch means and the pressure switch are in the first position whereby the further blocking means in moved into an open position.

37. The reciprocating internal combustion engine according to claim 36, wherein the third switch means is displaceable between a first and second position, the second electrical magnetic means includes a second winding means adapted to be energized when the first switch means is in the second position and the third switch means is in the first position whereby the blocking means in the exhaust means is displaced to the intermediate position.

38. The reciprocating internal combustion engine according to claim 37, wherein the second electromagnetic means includes a third winding means adapted to be energized when the first and third switch means are in the second position whereby the blocking means in the exhaust means is displaced to an open position.

39. The reciprocating internal combustion engine according to claim 38, wherein the first electromagnetic means includes a third winding means adapted to be energized when the first and fourth switch means are in the second position whereby the further blocking means is locked in an open position.

40. The reciprocating internal combustion engine according to claim 39, wherein a rod means is interposed between the further blocking means and the third switch means for transmitting movements of the further blocking means to the third switch means thereby controlling a positioning thereof.

* * * * *